United States Patent
Brown et al.

(10) Patent No.: US 7,437,712 B1
(45) Date of Patent: Oct. 14, 2008

(54) SOFTWARE BUILD TOOL WITH REVISED CODE VERSION BASED ON DESCRIPTION OF REVISIONS AND AUTHORIZING BUILD BASED ON CHANGE REPORT THAT HAS BEEN APPROVED

(75) Inventors: Bobby B. Brown, Kansas City, KS (US); Shawn M. Hudson, Olathe, KS (US); John J. Wright, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 841 days.

(21) Appl. No.: 10/762,598

(22) Filed: Jan. 22, 2004

(51) Int. Cl.
G06F 9/44 (2006.01)
(52) U.S. Cl. .................... 717/122; 717/121; 715/511
(58) Field of Classification Search ......... 717/120–122, 717/168–178; 715/511
See application file for complete search history.

(56) References Cited

U.S. PATENT DOCUMENTS

| | | | | |
|---|---|---|---|---|
| 4,809,170 A * | 2/1989 | Leblang et al. | ............. | 717/122 |
| 5,732,210 A * | 3/1998 | Buzbee | ........................ | 714/38 |
| 5,764,989 A * | 6/1998 | Gustafsson et al. | ......... | 717/129 |
| 5,806,078 A * | 9/1998 | Hug et al. | .................... | 715/511 |
| 5,815,720 A * | 9/1998 | Buzbee | ........................ | 717/158 |
| 5,838,978 A * | 11/1998 | Buzbee | ........................ | 717/158 |
| 5,848,274 A * | 12/1998 | Hamby et al. | ................ | 717/153 |
| 6,052,530 A * | 4/2000 | Buzbee et al. | ............... | 717/153 |
| 6,219,832 B1 * | 4/2001 | Buzbee | ........................ | 717/153 |
| 6,223,339 B1 * | 4/2001 | Shah et al. | ................... | 717/158 |
| 6,298,319 B1 * | 10/2001 | Heile et al. | .................... | 703/26 |
| 6,308,318 B2 * | 10/2001 | Krishnaswamy | ............ | 717/139 |
| 6,330,691 B1 * | 12/2001 | Buzbee et al. | ................ | 714/35 |
| 6,415,436 B1 * | 7/2002 | Patel | .......................... | 717/140 |
| 6,615,300 B1 * | 9/2003 | Banning et al. | ............. | 710/100 |
| 6,728,951 B1 * | 4/2004 | Gibson et al. | ................ | 717/140 |
| 7,047,465 B1 * | 5/2006 | Trimberger | .................. | 714/725 |
| 7,111,096 B1 * | 9/2006 | Banning et al. | ............. | 710/100 |
| 7,168,064 B2 * | 1/2007 | Ousterhout et al. | ......... | 717/120 |
| 7,194,730 B2 * | 3/2007 | Pramberger | .................. | 717/120 |
| 7,237,226 B2 * | 6/2007 | Simonyi | ...................... | 717/110 |

OTHER PUBLICATIONS

Web Management with Micrsoft Visual SourceSafe 5.0, Steven Banick et al, 2002, Whole book.*
Mastering XMI, Java Programming XMI, XML, and UML, Timothy Grose et al, pp. 314-315.*
The Jalapeno Dynamic Optimizing Compiler for Jaa, Michael G. Burket al, 1999, pp. 129-141.*
"A Compacting Incremental Collector and It's Performance in a Production Quality Compiler", Martin Larose et al, ACM, 1998, pp. 1-9.*

(Continued)

Primary Examiner—Todd Ingberg

(57) ABSTRACT

A system for managing software builds is provided. The system comprises a code control system operable to maintain a code version and a information associated with the code version, a parser module in communication with the code control system, the parser module operable to parse the information associated with the code version and create a change report, and a compiler module in communication with the code control system and operable to compile the code version into an object version based on the change report. A method of managing software builds is also provided. A method for building a software version is also provided.

26 Claims, 3 Drawing Sheets

OTHER PUBLICATIONS

An Incremental Compiler, M.K. Crowe, pp. 13-22, Jun. 1982.*

A Framework for Incremental Extensible Compiler Construction, Steven Carroll et al, ACM, 2003, pp. 53-62.*

On Converting a Compiler into an Incremental Compileer, Malcolm Crowe, et al, Oct. 1985, pp. 14-22.*

Mastering XMI, Java Programming XMI, XML, and UML, Timothy Grose et al, pp. 314-315, date unknown.*

* cited by examiner

SOFTWARE BUILD TOOL WITH REVISED CODE VERSION BASED ON DESCRIPTION OF REVISIONS AND AUTHORIZING BUILD BASED ON CHANGE REPORT THAT HAS BEEN APPROVED

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for building computer software.

BACKGROUND OF THE INVENTION

Building a modern software application often is a complicated process. The application or software may comprise multiple executable tasks, modules, or components as well as various data and/or configuration files. Parts of the software may need to be created from computer program source files by compiling the computer programs into object code or into byte code and then linking the object code into an executable (byte code may be run directly by an interpreter and need not be linked to be made executable). Compiling source code may need to take place in a particular order to resolve dependencies between the source code files. In addition to compiling source code, the building process may involve validating either the presence or contents of configuration files and also may involve processing other kinds of files or data. The end products of software build activities may be stored in archive files, for example, in JAVA archive (JAR) files. The number of sources and other files that are needed to build an application may be quite large, which adds to the complexity of building the application.

Building software may comprise both manual and automated steps. Typically, an automated build process is less time consuming and less error prone than a manual build process. Scripts are often employed to automate parts of the build process. A script is a series of commands that may be directly executed by a computer which understands the script language without the series of commands needing first to be compiled and or linked.

A code control system (CCS) is commonly associated with a software build system. The CCS provides mechanisms for controlling changes to the various files and sources which are employed to build the software as well as for controlling the resultant products of the build process. One of these mechanisms may include a locked check-out which prevents two developers from corrupting each other's work. Without a locked check-out mechanism, for example, if two developers check-out copies of the same file, each developer changes their checked out copy of the same file, each developer checks in their edited copy of the file, the last copy to be checked in writes over the edits of the first copy to be checked in, destroying those edits. With a locked check-out mechanism, only one developer is permitted to check-out a file for writing at a time. Others may check-out readable copies but not editable copies of the locked file. Another mechanism may enforce a policy that files may not be checked-out for writing without providing a reference to an active bug report or authorized software change request. Another mechanism may enforce a policy that files may not be checked-in without providing a reference to results of testing the changed software. A CCS may be purchased or leased as an off-the-shelf software product, for example MERANT's PVCS version management system or IBM's RATIONAL CLEARCASE software configuration management system.

The process of building software or building an application is sometimes referred to as conducting a software build, making a software build, or making a build. The result of the process of building software is sometimes referred to as a software build or a build.

SUMMARY OF THE INVENTION

The present embodiment provides a system for managing software builds. The system comprises a code control system operable to maintain a code version and a information associated with the code version, a parser module in communication with the code control system, the parser module operable to parse the information associated with the code version and create a change report, and a compiler module in communication with the code control system and operable to compile the code version into an object version based on the change report.

In one embodiment a method of managing software builds is provided comprising changing, by a developer, source code of a software archive, requesting, in a source archive system maintaining the software archive, a build of the software archive including the source code, the request including a build request template, generating a change matrix based on the build request template, notifying an approver of the software build request, notifying the developer when the software build request is denied by the approver, and rebuilding the software archive based upon the change matrix when the software build request is approved by the approver.

In one embodiment a method for building a software version is provided comprising storing a revised code version and a description of the revisions in a code control system, generating a change report based on the description of the revisions to the revised code version, authorizing a build of a software version including the revised code version, and building the software version based on the change report.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The software build tool of the present disclosure combines a JAVA-based website interface and Jakarta ANT scripts working in coordination with the MERANT PVCS version management system to manage the creation of Workflow Broker build JAVA archives (JARs). One objective for the software build tool is to provide a unified tool for introducing changes of JARs, for approving changes to JARs, and for building JARs.

Figure 1:
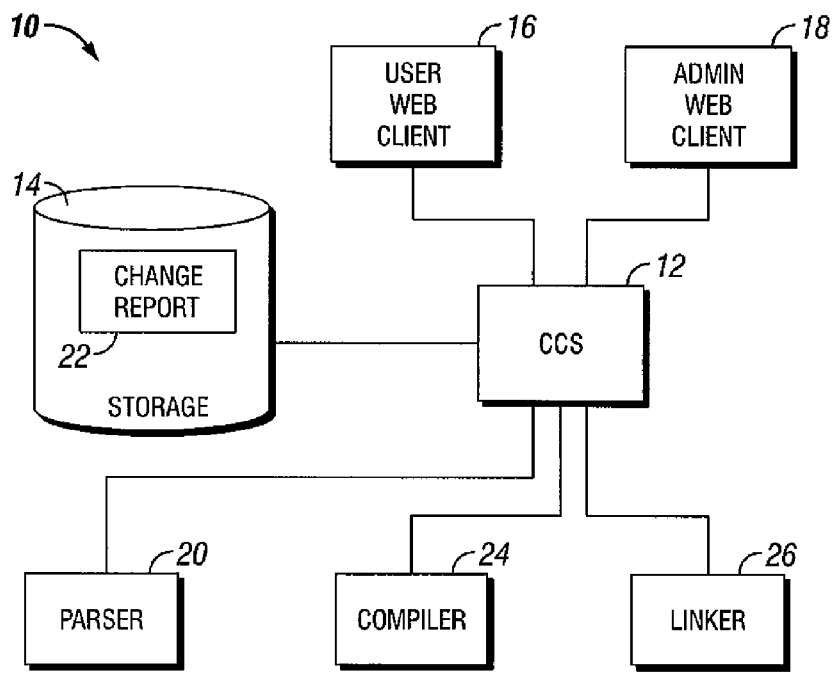
FIG. 1 is a block diagram of the software build tool system according to one embodiment.

Turning now to FIG. 1, a block diagram of a software build tool system 10 is depicted. A code control system (CCS) 12 stores the code sources, various files, and other input which are processed to build a software product or application. The code sources may include files in various programming languages, for example, JAVA and C++. The various files may include, for example, configuration text files, interface definition language (IDL) files, and data type definition (DTD) documents. An IDL file contains a language independent definition of how two modules or systems communicate with each other. When two systems communicate by passing text files back and forth between each other, for example by passing extensible markup language (XML) text files, a BUSINESSWARE application must be informed of what these text files contain. BUSINESSWARE applications obtain this information through examining metadata contained in metadata classes. The DTD documents may be compiled to produce the needed metadata classes, as described further hereinafter.

The CCS 12 also stores the intermediate and end products of the software build process including object files, compiled byte code files, executable files, and Workflow Broker build JAR files. The Workflow Broker may be a component or application of an commercial off-the-shelf (COTS) application such as VITRIA's BUSINESSWARE, which has been customized or tailored for these purposes. The CCS 12 also stores files associated with the mechanics of the build process itself including script files and a change report 22. The CCS 12 may be an off-the-shelf software application, for example the MERANT PVCS version management system. The CCS 12 may be associated with storage 14 where source files, configuration files, object code files, linked files, and other build product data are physically stored. In one embodiment, the CCS 12 provides the preferred method to access the storage 14.

The CCS 12 may provide interfaces which users and administrators may use to interact with and use the CCS 12, thereby accessing and interacting with the storage 14. A user web client 16 interface and an administrator web client 18 interface are depicted in FIG. 1, but in some embodiments there may be other interfaces. The user web client 16 may check-out files, modify checked-out files, and check-in files. Typically software developers would employ the user web client 16 to develop the software.

The CCS 12 may enforce a policy requiring the user web client 16 to provide text comments in conformance with a standard comment form when checking-in files. The comments describe the changes to the file, the version of the file being checked-in, perhaps a reference to test results, and other information. The standardization of the form of the file check-in comment makes the comments parseable by scripts. An example standard comment template is the following:

brief.description=a change
    ticket.num=I0007572767
    screenshots.update=yes
    states.added=
    states.removed=
    transitions.added=
    transitions.removed=
    events.added=
    events.removed=
    fields.added=
    fields.removed=

The states, events, transitions, and fields which are associated with the above example standard comment template refer to constructs employed in a software analysis model. For example, a state-transition model may represent one aspect of a software application as a plurality of static states, a set of allowed transitions among the states, and a set of events which may trigger specific transitions from a first state to a second state. Fields may refer to components of an object.

When a software build is required, for example, when a software module is changed, an event is generated which causes a parser module 20 to parse the standardized comments associated with the designated changed files and generates from these comments a change report 22, also referred to as a change matrix, which consolidates, for example in one document or file, the information necessary to define or specify the software build to be performed. The change report 22 may contain entries for multiple changed files, wherein one entry in the change report is associated with each changed file. In some embodiments, the JAVA properties format may be used to parse comments. In one embodiment, the change report 22 may be captured in a MICROSOFT EXCEL spreadsheet document, but the software build tool system 10 is not limited to employing a MICROSOFT EXCEL spreadsheet document to represent the change report 22. The change report 22 is stored in the CCS 12. The event which triggers the parser module 20 to generate the change report 22 may take different forms in different embodiments. For example, in a PVCS version management system the event may be the developer changing the status of an archive from SUBMIT status to CHANGED status, which is also known as promoting from SUBMIT status to CHANGED status. In other embodiments, the generation of the change report 22 triggers an email to be sent to build administrators that states that a build is waiting for their attention.

The change report 22 may be authorized by a build administrator using the administrator web client 18 interface. A build administrator examines the change report 22, verifies that software change policies have been adhered to, and approves or authorizes the software build (or disapproves the software build). The software change policies, for example, may require that testing be performed and test results be referenced in the change report 22. The test results reference might be introduced into the change report 22, for example, via a test results field in the standardized comment. When the change report 22 is approved or authorized, an event is generated which causes the software build to start. The event which triggers the software build may take different forms in different embodiments. For example, in the PVCS version management system the event may be the administrator changing the status of the archive, also referred to as promoting the archive status, from CHANGED to APPROVED status.

The software build process involves a compiler module 24 compiling source code into object code. The compiler module 24 may comprise one or more scripts which invoke one or more off-the-shelf compiler programs. The compiler module 24 is in communication with the CCS 12 and has access thereby to the source files and other files. The compiler module 24 may be responsible for validating the directory structures and contents of various files, for example, configuration files, before proceeding with the software build process. The compiler module 24 may determine a compilation order for source code and compile each source in the identified compilation order. In some embodiments the compilation order may be defined in a file, such as a makefile, rather than determined by the compiler module 24 at the moment of starting a compile. A makefile comprises a series of structures that define build targets, compilation dependencies, the commands to build the targets, and sometimes contains references to other makefiles. A makefile is used by the make utility which may be invoked by the compiler module 24 when compiling.

Several off-the-shelf compiler programs may be invoked if the source code is in more than one programming language, because off-the-shelf compiler programs are language specific. The compiler programs typically produce an intermediate object file from each source code file. JAVA compilers, however, typically compile Java source code files into byte code files which are ready to run on a JAVA virtual machine interpreter without any further processing. The object files and byte code files produced by the off-the-shelf compiler programs are stored in the CCS 12.

The next phase of the software build process involves a linker module 26 linking object files into executable files. The linker module 26 may comprise one or more scripts which invoke an off-the-shelf linker program. The linker module 26 has access to the object files via the CCS 12. The off-the-shelf linker program produces executable files from the object files. In some embodiments there may be no object files produced, for example, in a 100% JAVA based source code system, and hence in this embodiment there would be no need for a linker module 26.

At the completion of the software build process the software products are stored in the CCS 12 and are associated with a version identification. In some embodiments, an email providing notification of the result of the software build and referencing the change report 22 which controlled the software build may be sent out to members of the software development community and members of the software build administrator team. In some embodiments, the software build process may rebuild all software products. In other embodiments, the software build process may rebuild only those software products which have been affected by the changes described in the change report 22. The partial software build may be referred to as an incremental build. In an embodiment which supports incremental builds, however, a mechanism may be supported to force a complete rebuild.

The parser module 20, the compiler module 24, and the linker module 26 may not exist as separate and distinct modules or computer programs, but may be contiguous blocks of the build script. For example, build script lines 25 through 57 may be dedicated to the responsibilities of the parser module 20, parsing comments and generating the change report 22. Build script lines 62 through 68 may be dedicated to the responsibilities of the compiler module 24. Build script lines 87 through 89 may be dedicated to the responsibilities of the linker module 26. In other embodiments, however, the build script may call other scripts, computer programs, or subroutines which correspond to the parser module 20, the compile module 24, and the linker module 26.

The parser module 20, compiler module 24, linker module 26, CCS 12, user web client 16, and administrator web client 18 include scripts and/or computer programs which may execute on a general purpose computer system, which is discussed hereinafter.

Figure 2:
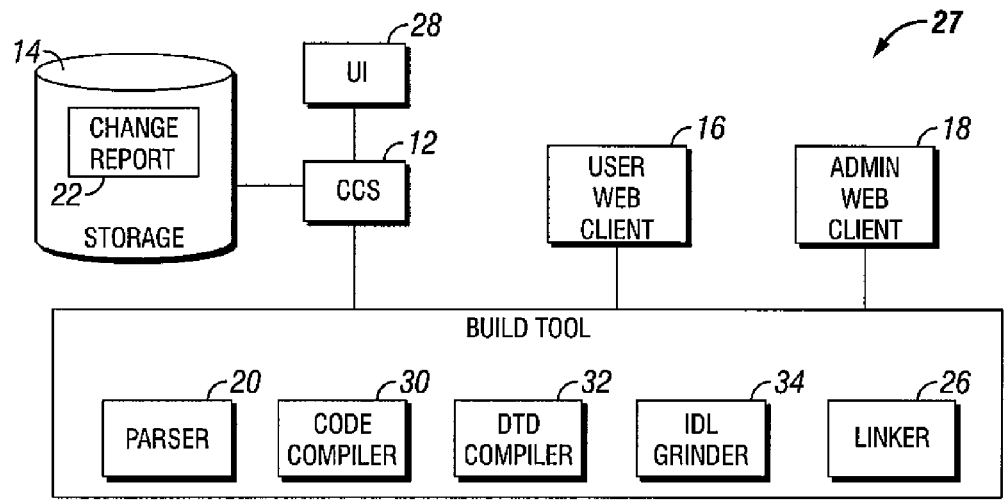
FIG. 2 is a block diagram of the software build tool system according to another embodiment.

Turning now to FIG. 2, a block diagram of another embodiment of a software build tool system 27 is depicted. A user interface 28 allows users to check-out and check-in code files and other files from the CCS 12. In this embodiment, the CCS 12 is a MERANT PVCS version management system, but in other embodiments a different off-the-shelf CCS 12 may be employed. A code compiler module 30 comprises one or more off-the-shelf compiler programs. A document type definition (DTD) compiler 32 compiles DTD documents into metadata classes. In the preferred embodiment, the metadata classes support VITRIA's BUSINESSWARE off-the-shelf software. An interface definition language (IDL) grinder 34 transforms IDL files into code stubs. The grinder 34 transforms IDL files into Java code stubs. Grinding is the interim act of compilation that is necessary to generate dependent class files for the host application to import required data sets(s). The subsequent importing and registering of these data sets with the host application, ensures a common interface definition persists between applications/technologies. IDL stub compilation is based upon the language, for example JAVA or C++, and creates a class file which then becomes the basis for subsequent code, such as JAVA or C++, to be compiled against.

The software build tool system 27 includes the user web client 16 interface and the administrator web client 18 interface. These web clients are supported by a web site application constructed as a standard JAVA Servlet/JAVA Server Pages (JSP) 2.3 web application. This web application is based on the Jakarta Struts web application framework. Struts is a simple web framework that provides a clean organization of the parts of a Servlet/JSP website.

The user logs on to the software build tool system 27 and triggers the parser 20 to generate the change report 22. In some embodiments, the JAVA properties format may be used to parse comments. The change report 22 may contain entries for multiple changed files, one entry per changed file. The user may review the change report 22 and submit the change report 22 for evaluation by the administrator. In this embodiment, the change report 22 is a MICROSOFT EXCEL spreadsheet file, but in other embodiments the change report 22 may be stored in a different file format. The software build tool system 27 may send an email containing a copy of the change report 22 in hypertext markup language format and containing a copy of a testing results document to the administrators.

The administrator logs on to the software build tool system 27 via the administrator web client interface 18 and reviews the change report 22. If the administrator decides that the software build should be launched, the administrator approves the change report 22 which triggers the software build to begin. In this embodiment, the administrator approves the change report 22 by changing the status of the change report 22 from the CHANGED status to APPROVED status, also referred to as promoting from CHANGED status to APPROVED status, in the MERANT PVCS version management system, CCS 12.

The software build tool system 27 executes a series of scripts when the software build process is started. The software build tool system 27 checks that all necessary directories exist in the CCS 12. The software build tool system 27 attempts to lock a special file in the CCS 12. The purpose of locking this special file is to assure that no other software build is being conducted at the same time, which would result in needless duplication of effort. If a lock cannot be obtained on the special file, the software build tool system 27 discontinues the software build process and sends an email to administrators stating that the special file is locked and should be unlocked. In some embodiments, the special file may be empty and plays no role other than to assure that only one build activity is occurring at a time.

The software build tool system 27 invokes the DTD compiler 32 to generate the metadata classes. The software build tool system 27 invokes the IDL grinder 34 to transform IDL files into IDL code stubs. The software build tool system 27 identifies an IDL file compilation order, a sequence for compiling the IDL files which is determined by dependencies among the IDL files, and then invokes the code compiler 30 to compile the IDL code stubs in the identified compilation order.

The software build tool system 27 invokes the code compiler module 30 to compile the source code files. In the illustrated embodiment the code compiler module 30 may determine a compilation order for source code and compile each source in the identified compilation order. In other embodiments, the compilation order may be defined in a file, such as a makefile, rather than determined by the code compiler module 30 at the moment of starting the compile. The software build tool system 27 invokes the linker module 26 to link object files into executable files, if necessary.

The various products, including Workflow Broker build JARs, of the software build process are stored in the CSS 12 as they are completed. When the entire software build process has completed successfully version information is applied to the end products of the software build process. In some embodiments, names other than SUBMIT, CHANGED, and APPROVED may be used to denote the status of change reports 22.

The CCS 12, user web client 16, administrator web client 18, parser module 20, code compiler module 30, DTD compiler module 32, IDL grinder module 34, and linker module 26 comprise scripts and/or computer programs. Because much of the build process is controlled by scripts rather than compilable computer programs, the identification of the parser module 20, code compiler module 30, DTD compiler module 32, IDL grinder module 34, and linker module 26 may be on the basis of the function of a block of script commands rather than separate files, components, or modules which may execute as distinctly different subroutines, processes, or tasks.

In the preferred embodiment, the build scripts are Jakarta ANT scripts, some of which are extended using mechanisms provided by Jakarta ANT for extending its capabilities. To maximize the reusability of the build scripts, source and file directories may be structured to conform with current Java community practices known to those skilled in the art.

Figure 3:
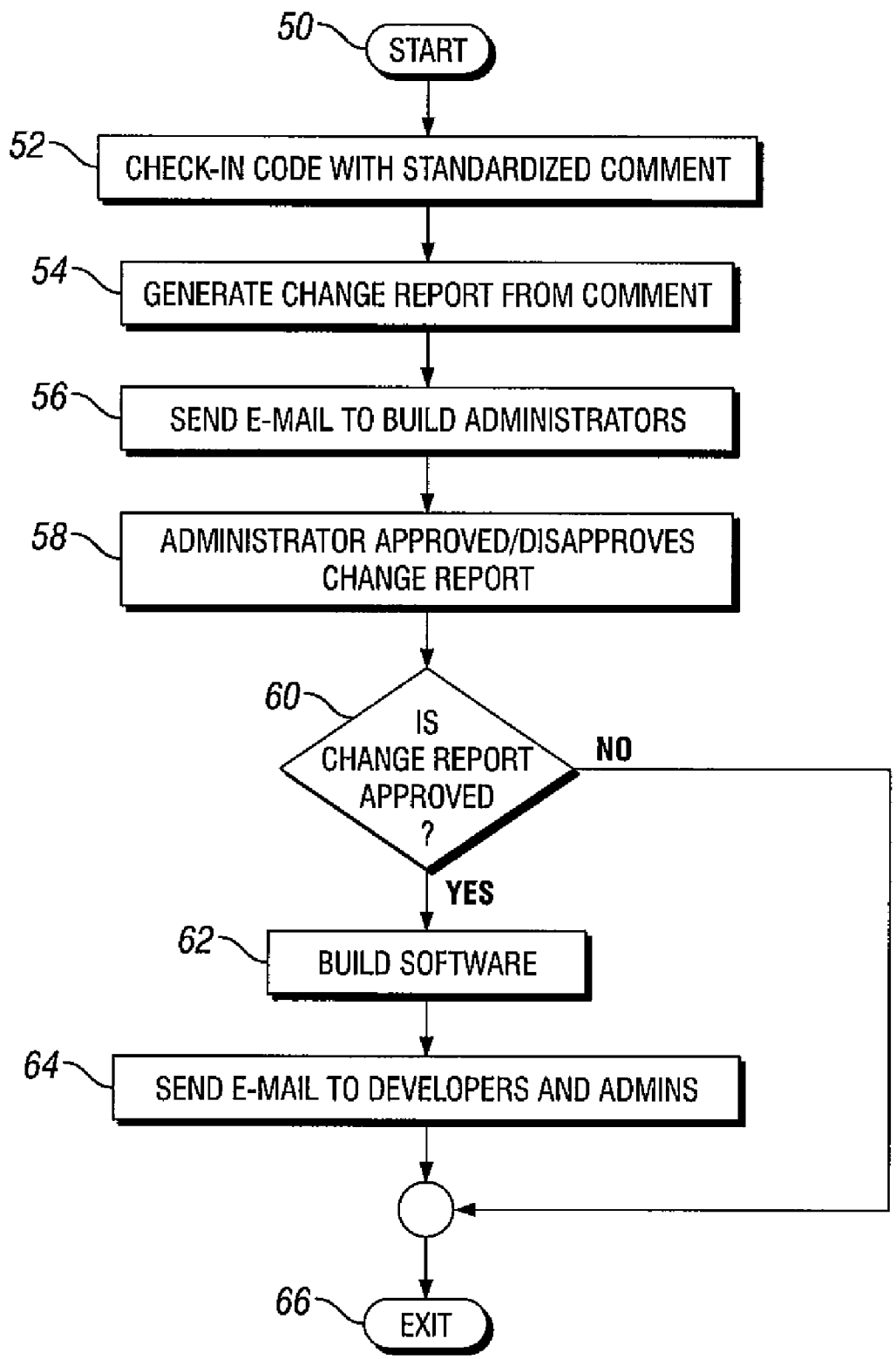
FIG. 3 is a flow diagram for a method of building a software application.

Turning now to FIG. 3, a flow chart illustrating a process for building software employing the software build tool system 27 is shown. The process begins at block 50 and proceeds to block 52 where changed code is checked into the CCS 12 with a comment conforming to a standardized comment form. This standardized form includes fields for information that is needed to build the associated software. The process proceeds to block 54 where a change report 22 is generated based on parsing the comment associated with the checked-in code provided in block 52. The process proceeds to block 56 in which an email is generated and sent to all build administrators to notify them that a change report 22 is pending authorization. The process proceeds to block 58 in which an administrator either approves or disapproves the change report 22.

At block 60, if the change report 22 is approved the process proceeds to block 62 in which the build of software is performed. The process proceeds to block 64 in which an email is generated and sent to developers and build administrators describing the build which was just completed. The process proceeds to block 66 where the process exits. If, at block 60, the change report 22 is disapproved the process proceeds directly to block 66 where the process exits without performing a build.

Figure 4:
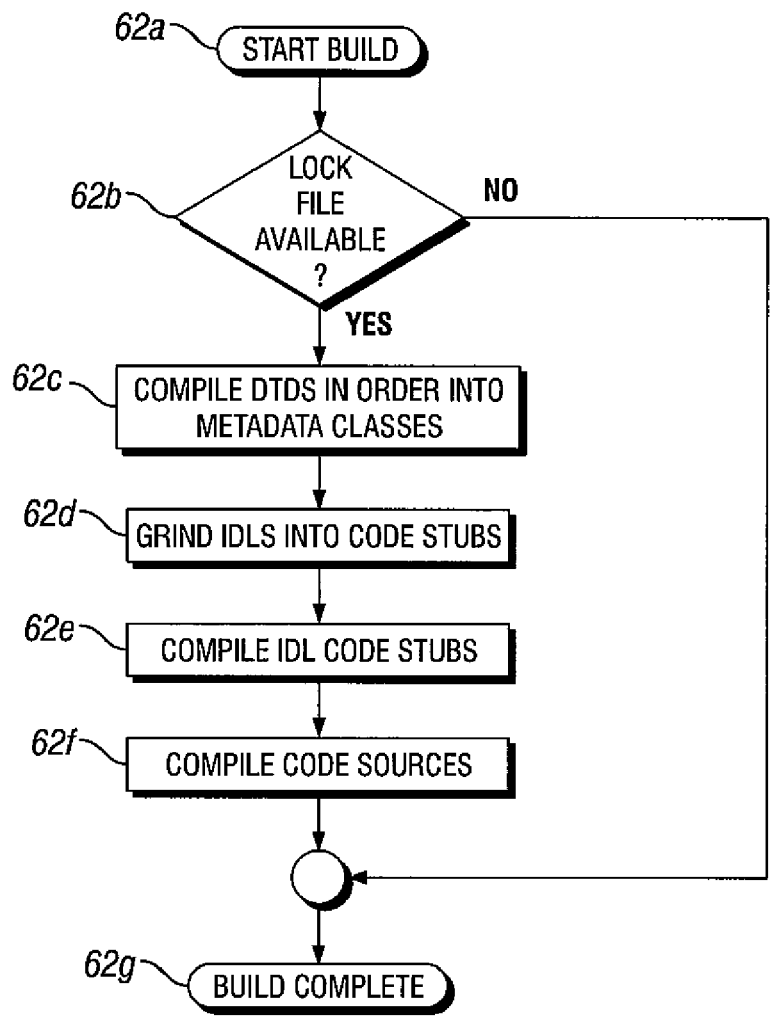
FIG. 4 is a flow diagram of a detailed portion of the method of building a software application.

Turning now to FIG. 4, a flow chart illustrating the detailed steps involved in building the software in block 62 above are represented. The process begins at 62a. At block 62b, if all necessary directories exist and a lock can be placed on the special file, the process proceeds to block 62c in which the DTDs are compiled into metadata classes and these metadata classes are imported into a local BusinessWare instance. Recall that the special file may be empty and plays no role other than to assure that only one build activity is occurring at a time.

The process proceeds to block 62d where those IDLs which have changed since the last build are ground into code stubs (the IDLs which remain unchanged need not be ground again, since their code stubs are still in the CCS 12). The timestamp of the last build is kept in a file stored in each CCS 12 PVCS project build directory, for example in a file named cmac.control. Note that the DTDs are compiled before grinding the IDLs into code stubs, because some of the IDLs depend upon metadata in the DTDs. The process proceeds to block 62e where the proper compilation order for the IDL code stubs is determined and the IDL code stubs are compiled. The IDL stubs are kept in a separate directory from the other source code so that they may be zipped-up if a developer needs only the IDL stubs. Zipping a set of files is a process of packaging the files into a single file using a zip command. The files are later extracted from the zipped file using an unzip command. It will be appreciated that other compression systems may be used as well.

The process proceeds to block 62f in which code sources are compiled. Only source files which have changed are compiled, assuring a short build time. Note that the IDL stubs are compiled before the source is compiled because the source code may depend upon the IDL stubs. Where BUSINESSWARE is used, the BUSINESSWARE Connector def classes are called to create the customer connector INIS. INIS may refer to any structure where all the property files are stored, such that these property files or configuration files provide environment specific information based upon where they are deployed. The classes to call are stored in the project configuration file. The build is associated with a timestamp, and the lock on the special file is released.

The process proceeds to block 62g where the software build completes. If a lock cannot be placed on the special file in block 62b the process proceeds directly to block 62g and completes without having built the new software. If the build process produces object code which needs to be linked, there would be a block between block 62f and block 62g in which the object code was linked to produce an executable file.

While in the preferred embodiment the software build tool system 27 executes on a centralized build server, in other embodiments the software build tool system may execute on workstation computers dedicated to a software build administrator.

The software build tool systems 10 and 27 illustrated in the embodiments described above may complete software builds faster than less automated build systems. When making builds manually, occasionally a needed file is overlooked and not built into the new software load. This error may not be discovered until the software load is installed and executed, wasting time and delaying development progress. The software build tool system 10, 27 is readily redeployed to support a different project or the next revision stage of a project. Further, the file lock mechanism contemplated for some embodiments of the software build tool system 10, 27 avoids duplication of administrator effort.

The software build tool systems 10 and 27 also enable software builds to be run more frequently, because the build administrators's involvement is reduced and hence eliminates them as a bottle neck, which makes the software development process smoother and more efficient.

Figure 5:
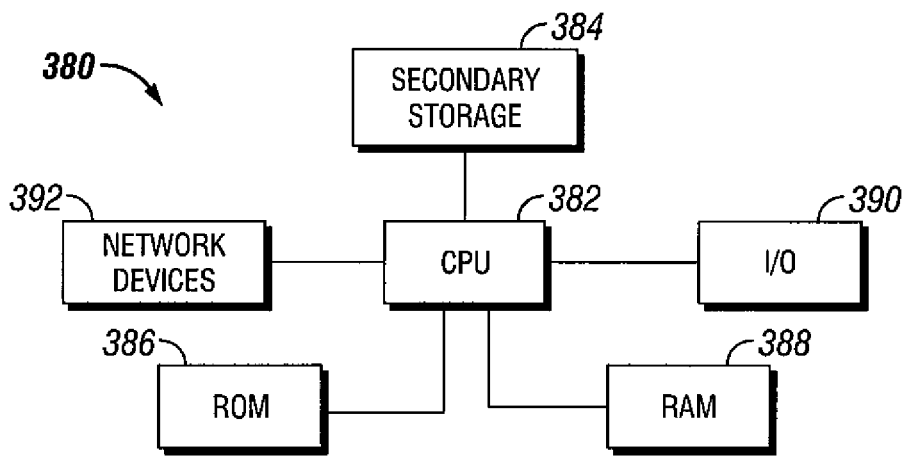
FIG. 5 illustrates an exemplary general purpose computer system suitable for implementing the several embodiments of the software build tool.

The embodiments of software build tool systems 10 and 27 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for managing software builds, comprising:
an executable code control system stored on a computer readable storage medium that is not a carrier wave, wherein, upon being executed, the control code system maintains a code version and standardized comments describing changes made in the code version;
an executable parser module stored on a computer readable storage medium that is not a carrier wave, wherein, upon being executed, the parser module is in communication with the code control system and the parser module parses the standardized comments describing the changes made in the code version and creates a change report, wherein the change report is associated with a state including one of a pending state, an approved state, and a disapproved state; and
an executable compiler module stored on a computer readable storage medium that is not a carrier wave, wherein, upon being executed, the compiler module is in communication with the code control system and compiles the code version into an object version upon the state of the change report being the approved state.

2. The system of claim 1, wherein the information associated with the code version includes comments describing the code version.

3. The system of claim 1, further including a linker module in communication with the code control system, the linker module links the object version into an executable version.

4. The system of claim 3, wherein the linker determines when the code version is compiled into the object version.

5. The system of claim 1, wherein the parser module determines when the code version has changed.

6. The system of claim 1, wherein the compiler module determines when the change report transitions from the pending state to the approved state.

7. The system of claim 1, further comprising an interface definition language grinder module that transforms an interface definition language document into the code version.

8. The system of claim 7, wherein the code version of the interface definition language grinder module is further defined as a code version of an object oriented programming language sold under the trademark JAVA.

9. A method of managing software builds, comprising:
changing, by a developer, source code of a software archive maintained by a source archive system;
requesting a build of the software archive including the source code, the request including a build request template including standardized comments describing the change to the source code;
generating a change matrix based on the standardized comments of the build request template;
notifying an approver of the software build request;
notifying the developer when the software build request is denied by the approver; and
rebuilding the software archive maintained by the source archive system based upon the change matrix when the software build request is approved by the approver.

10. The method of claim 9, wherein notifying the approver further comprises:
generating a unique number associated with the change matrix; and
providing a test condition.

11. The method of claim 10, wherein test condition is further defined as a document related to testing the source code.

12. The method of claim 9, wherein generating the change matrix includes:
providing a plurality of comments in the build request template;
parsing at least some of the plurality of comments of the build request template into objects; and
providing the objects to change matrix.

13. The method of claim 12, wherein the comments include a description, a number associated with the request and information related to changes to the source code.

14. The method of claim 13, wherein the number associated with the request is further defined as a unique number.

15. The method of claim 13, wherein the changes to the source code include a fields changed portion and an events changed portion.

16. The method of claim 9, wherein rebuilding the software archive further comprises:
providing a plurality of data type definition files associated with the software archive;
providing a plurality of interface definition language files associated with the software archive;
manipulating a changed one of the plurality of data type definition files; and
manipulating a changed one of the interface definition language files.

17. The method of claim 9, wherein rebuilding the software archive further comprises:
identifying a plurality of components of the software archive necessary to rebuild the software archive;
stamping, with a previous build information, the components of the software archive; and
determining the components to re-compile based on the stamp; and
compiling the components of the software archive based on the stamp.

18. The method of claim 17, further comprising compiling only the components of the software archive stamped with a time indicating the component has been modified since a previous build.

19. The method of claim 17, wherein the previous build information is further defined as a time stamp associated with each component of the software archive.

20. A method for building a software version, comprising:
storing a revised code version and a description of the revisions in a code control system using standardized comments;
generating a change report based on the description of the revisions to the revised code version;
authorizing a build of a software version including the revised code version upon approving the change report; and
building the software version based on the change report upon the authorization of the build of the software version.

21. The method of claim 20, wherein building the software version further includes compiling a document type definition document into metadata classes.

22. The method of claim 21, wherein the metadata classes are further defined to be metadata classes of a commercial-off-the-shelf application sold under the trademark VITRIA BUSINESSWARE.

23. The method of claim 20 wherein building the software further comprises:
grinding an interface definition language document to produce a code version of an object oriented programming language sold under the trademark JAVA; and
compiling the code version of the object oriented programming language sold under the trademark JAVA.

24. The method of claim 20, wherein building the software further includes compiling and linking the code version.

25. The method of claim 20, wherein the generating a change report further includes sending an email notification of the change report to one or more administrators.

26. The method of claim 20, wherein the authorizing the software build includes sending an email notification of the authorization to one or more software developers.

* * * * *